United States Patent Office 3,088,746
Patented May 7, 1963

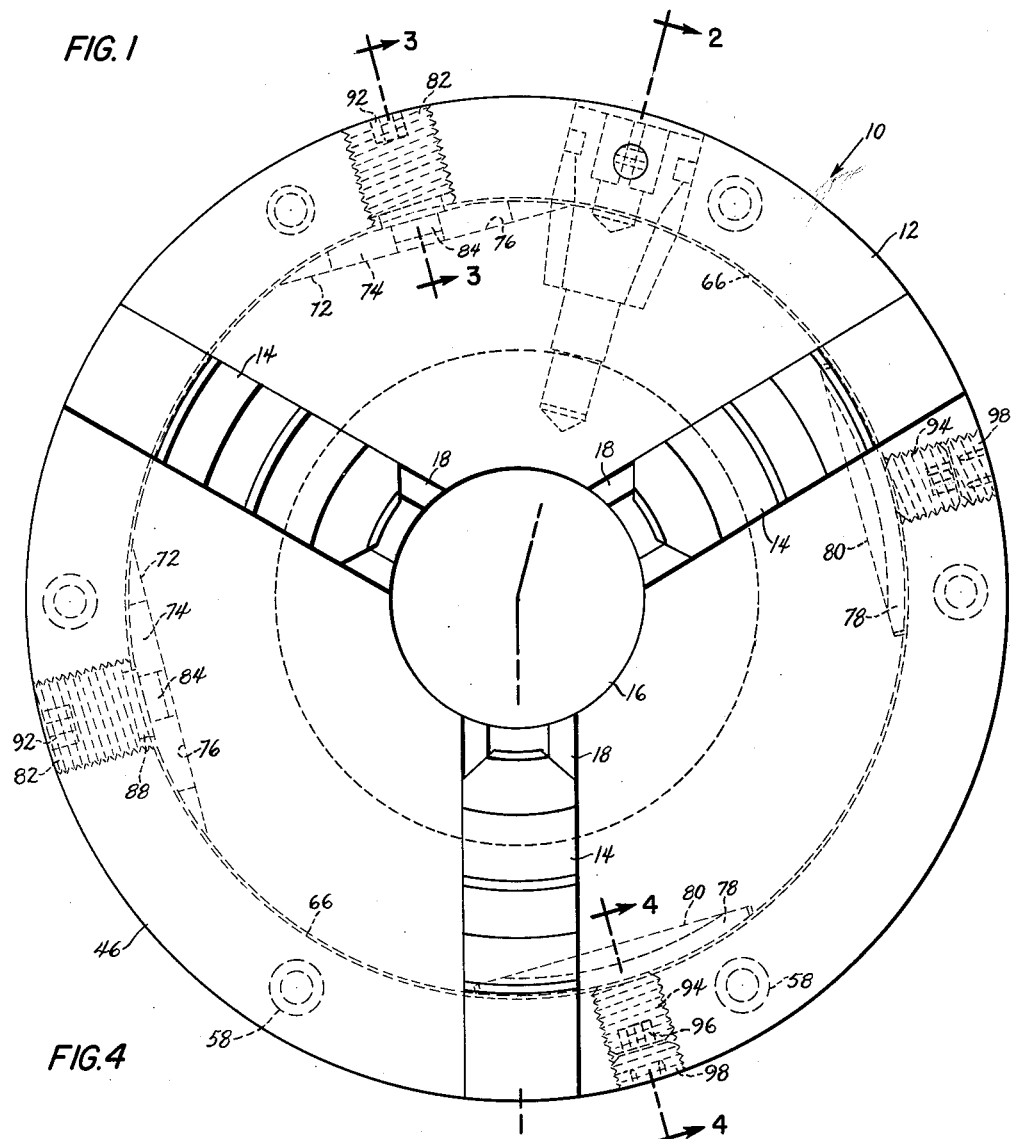
FIG. 1
FIG. 4
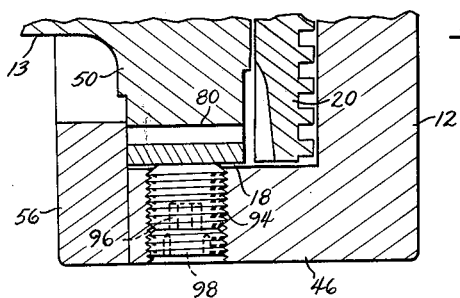
INVENTORS
GEORGE A. HIGHBERG
WALTER E. BEANEY
JAMES C. GREENLEES, JR.
BY Teller + McCormick
ATTORNEYS May 7, 1963 G. A. HIGHBERG ET AL 3,088,746
RADIALLY ADJUSTABLE CHUCK
Filed Dec. 8, 1960 2 Sheets-Sheet 2
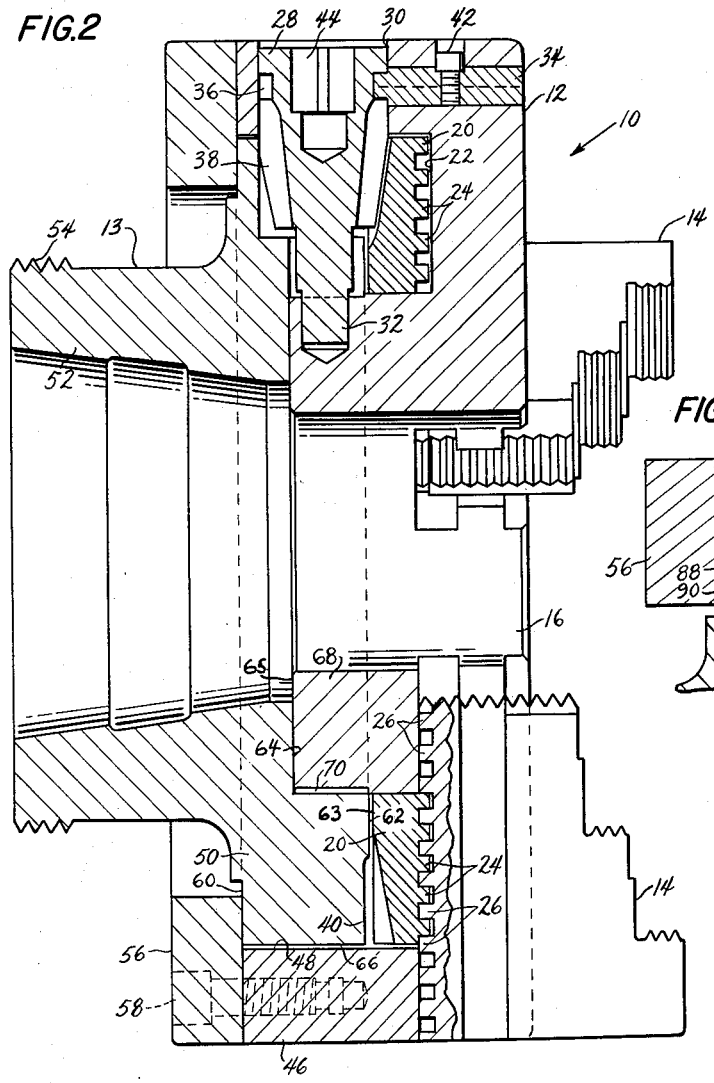
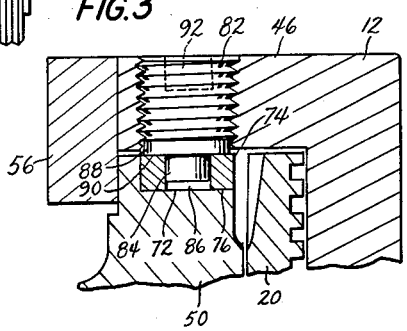
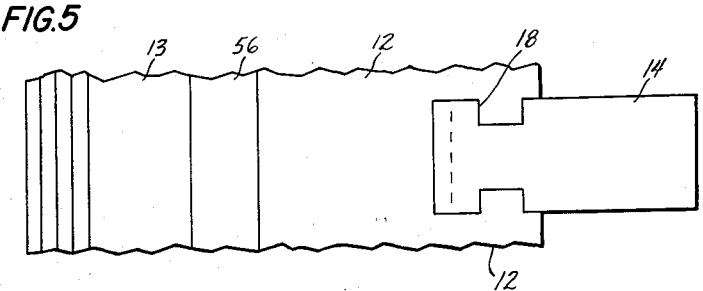

3,088,746
RADIALLY ADJUSTABLE CHUCK
George A. Highberg, West Hartford, Walter E. Beaney, New London, and James C. Greenlees, Jr., Quaker Hill, Conn., assignors to The Whiton Machine Company, New London, Conn., a corporation of Connecticut
Filed Dec. 8, 1960, Ser. No. 74,604
13 Claims. (Cl. 279—110)

This invention relates to a workpiece supporting chuck for use with a machine tool, and more particularly relates to a chuck which is radially adjustable to accurately center the workpiece with respect to the spindle to which the chuck is attached.

The centering means proposed by the present invention finds utility in connection with a universal chuck wherein the jaws, usually three in number, are simultaneously moved radially for gripping the workpiece. Such a chuck is considerably easier to operate than one having independently adjustable jaws and generally functions to fairly accurately center the workpiece. Its centering action is automatic due to the simultaneous and equal movement of the jaws. However, when completely accurate centering of the workpiece is required the standard universal chuck is generally unacceptable, since even the most carefully manufactured universal chuck cannot be relied upon to center a workpiece within more than several thousands of an inch accuracy.

To overcome the accurate centering deficiency generally inherent in universal chucks, various chucks have been proposed in the past wherein the simultaneously movable jaws of a universal chuck are carried by a supporting member that is in turn radially adjustable with respect to another spindle supported member. Thus, the jaw supporting member may be shifted relative to the spindle axis to compensate for the inaccurate centering action of the jaws. While such an arrangement is sound in principle, the chucks so designed in the past have generally been unsatisfactory and have had poor commercial acceptance. Probably the chief reason for this poor acceptance has been the failure to provide a simple and reliable means for effecting the adjustment between the jaw supporting member and the spindle connected member, and at the same time providing a simple means for the transmission of driving torque between the two members. That is, the two members must not only be radially adjustable relative to each other in two mutually perpendicular directions to fulfill the centering function, but also must be drivingly connected in all positions of adjustment. In the prior devices the adjustments necessary to bring an initially off-center workpiece into concentricity have been time consuming and have required a great many manipulations, measurements and the like on the part of the operator. Furthermore, the means provided for transmitting torque between the two members have generally required additional operations on the part of the operator, such as the loosening of bolts, screws or other fasteners before the centering adjustments may be made, to be followed by the retightening of these elements after the centering adjustments are completed.

The general object of this invention is therefore to provide a chuck having improved means for adjusting a jaw supporting member radially of a spindle connected member for the purpose of centering the jaws, and a workpiece gripped thereby, with respect to the spindle axis.

Another object of this invention is to provide a chuck of the character mentioned in the last paragraph and wherein the means employed for performing the stated centering adjustment also functions in a novel manner to provide for the transmission of driving torque between the two members.

A further object of this invention is to provide a chuck having simultaneously movable jaws, as in a standard universal chuck, coupled with means for radially adjusting the jaw supporting member to permit truly accurate centering of a workpiece, the adjustment means being such as to produce permanent and accurate centering with relatively few manipulations by the operator.

Other objects and advantages of the invention will be apparent from the drawings and from the following description.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:
FIG. 1 is a front elevational view of a chuck embodying this invention,
FIG. 2 is a sectional view taken on the line 2—2 of FIG. 1,
FIG. 3 is a fragmentary sectional view taken on the line 3—3 of FIG. 1,
FIG. 4 is a fragmentary sectional view taken on the line 4—4 of FIG. 1, and
FIG. 5 is a fragmentary elevational view of a portion of the periphery of the chuck shown in FIG. 1, and illustrates the manner in which one of the jaws is connected to the jaw supporting member.

Referring now to FIGS. 1 and 2, a chuck embodying this invention is indicated generally by the reference numeral 10. The chuck 10 comprises in general a jaw supporting member 12 and a second member 13 which is adapted for connection to the spindle (not shown) of a machine tool such as a lathe. The two members 12 and 13 are restrained against relative axial movement, but are relatively movable, as hereinafter described, in a radial plane so that the jaw supporting member 12 may be moved to bring a workpiece gripped by its jaws into truly concentric relationship with the axis of the spindle supported member 13.

The jaw supporting member 12 and its associated parts are preferably generally similar in structure and function to the corresponding parts of a conventional universal chuck, although such similarity is not essential to the present invention. As shown best in FIG. 1, the member 12 carries three jaws 14, 14 arranged in angularly spaced relationship about a central opening 16, the jaws 14, 14 being received in radial grooves 18, 18 on the forward face of the member 12. As shown in FIG. 5, the jaws and the grooves are of conforming T-shaped cross section so that the jaws are confined to the member 12 for radial sliding movement relative to the central opening 16. The jaws 14, 14 are arranged to be moved simultaneously and in equal increments so as to function, when moved into gripping relationship with a generally cylindrical workpiece, to approximately center the workpiece with respect to the member 12. As is the case with most universal chucks, however, the jaws 14, 14 cannot be relied upon to accurately center such a workpiece to within more than several thousandths of an inch.

Various conventional means may be employed for moving the jaws of the chuck, and one suitable means is illustrated in the drawings. This illustrated means is of the nature which is characteristic of a universal chuck of the "scroll" type. Referring to FIG. 2, this means includes an annular scroll member 20 which is slidably received in a recess 22 formed in the rear face of the member 12. The scroll member 20 is rotatable about the axis of the member 12 and on its forward face is provided with spiral gear teeth 24, 24 which intermesh with corresponding teeth 26, 26 on the rear face of each of the jaws 14, 14. Actually, the spiral teeth 24, 24 on the scroll member 20 comprise a single and continuous spiral rib which cooperates with the teeth 26, 26 on the jaws 14, 14 to move the same radially inwardly or outwardly relative to the central opening 16 upon rotation of the scroll member 20 in one direction or the other.

Rotation of the scroll member 20 relative to the jaw supporting member 12 is effected by a key member 28 received within a radial opening 30 formed in the periphery of the jaw supporting member 12. The key member 28 is rotatable about a radial axis and is supported within the opening 30 by an end portion 32 journaled in the member 12 and by a retaining pin 34 which extends axially through the member 12 and at its inner end interfits with an annular groove 36 on the periphery of the key member 28, as shown in FIG. 2. The retaining member 34 is removably held in place with respect to the jaw supporting member 12 by a screw 42. Intermediate the ends of the key member 28 is a bevel gear portion 38 comprising gear teeth which intermesh with corresponding gear teeth 40 on the rear face of the scroll member 20. The head of the key member 28 is recessed to form a square-shaped socket 44 which receives a square wrench for turning of the same. Such turning of the key member 28, of course, causes rotation of the scroll member 20 by virtue of the intermeshing relationship between the bevel gear portion 38 and the gear teeth 40.

The jaw supporting member is further provided with an annular peripheral flange portion 46 which extends axially rearwardly of the jaws 14, 14 and of the scroll 20 and defines an annular recess 48 in the rear face of the jaw supporting member 12. The recess 48, as shown in FIG. 2, is essentially a rearward continuation of the scroll receiving recess 22, but this of course will not generally be the case if something other than a scroll member is employed for moving the jaws 14, 14.

The second, or spindle supported member 13 includes a head portion 50 which is received within the recess 48 defined by the peripheral flange portion 46 of the jaw supporting member 12. As shown in FIG. 2, the member 13 also includes a portion 52, integral with the head portion 50, provided with external threads 54 adapted for threaded connection with a machine tool spindle having corresponding internal threads. It is, of course, to be understood that the portion 52 may take various forms depending on the structure of the spindle with which the chuck is to be employed, and that the external threads 54 and the shape of the portion 52 are shown herein by way of example only.

The head portion 50 of the second member 13 is positioned in axially overlapped relationship with the peripheral flange portion 46 and is held in axially fixed relationship therewith by suitable means such as a retaining ring 56 connected to the rear face of the peripheral flange portion 46 by a plurality of screws 58, 58. The retaining ring 56 extends radially inwardly from the peripheral flange portion 46 at a location behind the head portion 50 and slidably engages the rear face 60 of the latter portion. The forward face 62 of the head portion 50 is preferably spaced slightly from the rear face 63 of the scroll member 20, as shown in FIG. 2, so that the head portion will not bind the scroll member or prevent its free rotation by the key member 28. Radially inwardly of the forward face 62 the head portion has another face 64 which engages the rear face 65 of the jaw supporting member 12. Referring to FIG. 2, it will therefore be seen that the head portion 50 is axially held in place with respect to the jaw supporting member by engagement with the retaining ring 56 and the rear face 65.

The relative dimensions of the parts are such that no axial play exists between the head portion 50 and the peripheral flange portion 46, and yet are such that the head portion may be moved radially of the flange portion, as described below, when a certain degree of force is applied to the head portion.

Although the head portion 50 is axially restrained relative to the peripheral flange portion 46, the former portion is made slightly smaller than the recess 48 in the radial dimension so that the two portions have a certain amount of looseness in the radial direction which permits the jaw supporting member 12 to be moved relative to the second member 13 to compensate for an initial off-center condition of a workpiece gripped by the jaws 14, 14. As shown in FIGS. 1 and 2, the difference in size between the head portion 50 and the recess 48 results in a small radial gap 66 between the head portion 50 and the peripheral portion 46. In the present instance, the jaw supporting member 12 also includes a rearwardly extending annular portion 68 which partially axially overlaps the radially inner periphery of the head portion 50, and this portion is also radially spaced from the head portion 50 to permit radial movement between the jaw supporting member 12 and the second member 13. This spacing produces an annular gap 70 between the two portions, as shown in FIG. 2.

Also included in the illustrated chuck are means cooperating with the axially overlapped portions 46 and 50 for adjustably positioning the jaw supporting member 12 relative to the second member 13, and for transmitting driving torque between the two members. Referring to FIGS. 1 and 3, this means includes two mutually perpendicular flat faces 72, 72 formed on the periphery of the head portion 50. Cooperating with the flat faces 72, 72 are two pressure members or plates 74, 74 having flat surfaces 76, 76 which bear against the flat faces 72, 72. The plates 74, 74 are located between the peripheral flange portion 46 and the head portion 50. Also interposed between the peripheral flange portion and the head portion are two spring means disposed respectively at locations diametrically opposite from the flat faces 72, 72. As shown in FIGS. 1 and 4, these spring means preferably consist of two bow springs 78, 78 disposed in flat-bottomed notches 80, 80 provided in the periphery of the head portion 50. The bow springs 78, 78 are arranged with their positively curved surfaces facing radially outwardly with the result that the opposite ends of each spring engage the flat bottom of the associated notch 80, as shown in FIG. 1. Each of the bow springs 78, 78 works in opposition to the pressure member or plate 74 located diametrically oppositely therefrom. That is, the spring 78 serves to bias the head portion 50 toward the opposite pressure plate 74 so that the associated flat face 72 is held in firm engagement with the flat surface 76 of the plate 74.

Radial inward movement of each pressure plate 74 is opposed by the opposite spring 78, while during radial outward movement of the plate the opposite spring will function to move or return the head portion 50 so as to retain the flat face 72 in contact with the flat surface 76 of the plate. The radial positions of the pressure plates 74, 74 are adjustable by means of two screws 82, 82 which are threadably received in radial openings formed in the peripheral flange portion 46 at the location of the plates 74, 74. The two screws 82, 82 extend through the peripheral flange portion 46 and at its radially inner end each screw had a reduced diameter cylindrical portion 84 which fits within an opening 86 formed in the associated pressure plate or member 74. The cylindrical portion 84 thus serves to restrain the associated pressure plate 74 against angular or circumferential movement relative to the peripheral flange portion 46. Adjacent the cylindrical portion 84, each screw 82 is also provided with another cylindrical portion 88 having a diameter greater than the portion 84 so as to provide an inwardly facing shoulder 90 which bears against the radially outer surface of the associated pressure plate 74. Preferably, the outer surface of the plate 74 is flattened adjacent the opening 86 so as to provide a flat seat for the shoulder 90. Each of the screws 82, 82 is provided with a square or hexagonal-shaped socket recess 92 for receiving a correspondingly shaped wrench for turning the screw.

Referring to FIG. 1, it will be apparent that turning one of the screws 82 to move the same inwardly with respect to the peripheral flange portion 46 will cause radial inward movement of the associated pressure plate or member 74 and will consequently cause movement of the head portion 50 so as to compress the diametrically opposite bow spring 78. As the head portion 50 is moved as a result of this adjustment of the screw 82, the head portion will be guided by a sliding movement occurring between the other pressure plate or member 74 and its associated surface 72. Thus, the head portion 50 will travel in a straight line parallel to the guiding face 72. That is, its movement relative to the peripheral flange portion will be purely rectilinear. Likewise, when the other screw 82 is adjusted to move the head portion 50, the latter portion will again move in a straight line, or rectilinearly as a result of its being guided by sliding movement occurring between the first pressure plate 74 and its associated face 72. The two straight lines, or the two directions of rectilinear movement, along which the head portion 50 is moved as a result of the adjustment of the two screws 82, 82 are at right angles to each other. As a consequence of this, the head portion 50 may be given any resultant displacement relative to the peripheral flange portion 46 by moving each of the adjusting screws 82, 82 only once. This therefore means that the relative eccentricity of the two members 12 and 13 may be adjusted to the value necessary to bring an initially off-center workpiece gripped by the jaws 14, 14 into concentricity with the axis of the second member 13 by the simple process which includes only the steps of first adjusting one of the screws 82 and then adjusting the other one of the screws 82.

While it is preferred that each of the two screws 82, 82 have associated therewith flat-surfaced pressure plates, such as those shown at 74, 74, these plates are not entirely necessary to the broader aspects of the invention, and in place of the plates 74, 74 the two screws could be made to bear directly against the flat surfaces 72, 72. In such a case the screws should preferably be made with relatively large flat faces at their inner ends so as to provide a large bearing area between the screws and the flat faces 72, 72.

The two bow springs 78, 78 also preferably have associated therewith means for preloading the same to adjust the biasing force exerted on the head portion 50. Suitable means for accomplishing this is shown in FIGS. 1 and 4 and includes two screws 94, 94 associated respectively with the springs 78, 78, the two screws 94, 94 being threaded into radial openings in the peripheral flange portion 46 at the locations of the bow springs. The inner end of each of the screws 94, 94 bears against the radially outer or positively curved surface of the associated spring 78, and by threading the screw into or out of its opening in the peripheral flange portion it will be apparent that the screw will serve to vary the initial compression of the spring. To provide for turning movement of the screws 94, 94 each of the screws is provided with a square or hexagonal socket recess 96 for receiving a corresponding wrench. Preferably, each of the radial openings in the peripheral flange portion 46 receiving the screws 94, 94 also receive locking screws 98, 98 which serve to hold the screws 94, 94 in place and prevent their further movement once they are adjusted to a desired position.

In addition to providing for the relative radial adjustment of the two members 12 and 13 to vary the relative eccentricity thereof, the means hereinabove described also serves to transmit driving torque between the two members so that torque imposed on the spindle supported member 13 by the spindle will be transmitted to the jaws 14, 14 to rotate a workpiece gripped by the jaws. The manner in which torque is transmitted between the two members is best understood by reference to FIG. 1. From this figure it will be noted that the two perpendicular flat faces 72, 72 on the head portion 50 provide the head portion with a right-angled V or wedge shape, and that the two associated pressure members or plate 74, 74 carried by the peripheral flange portion 46 define a right-angled V-shaped notch or recess which receives the head portion 50 in interfitted relationship therewith. The two bow springs 78, 78 in turn serve to urge the V or wedge-shaped part of the head portion 50 into the V-shaped notch provided by the pressure plates 74, 74 and to hold the head portion in interfitted relationship therewith. Thus, when the spindle supported member 13 is rotated by the spindle, the head portion 50 will transmit torque to the peripheral portion 46 of the jaw supporting member 12 by forces transmitted through the coengagement of the pressure plates 74, 74 and the flat surfaces 72, 72, and through the coengagement of the bow springs 78, 78 with their associated notches 80, 80. The bow springs 78, 78, of course, are chosen so that the spring force exerted thereby against the head portion 50 is sufficient to hold the head portion in interfitted V or wedge relationship with the pressure plates 74, 74 as normal driving torque is transmitted between the two members 12 and 13.

The operation of the chuck 10 will now be briefly described as follows. In use, the chuck is attached to the spindle of a machine tool, such as a lathe, by threading the threaded portion 52 of the second member 13 into a correspondingly threaded portion of the machine tool spindle, which spindle serves to rotate the chuck. A cylindrical workpiece is then positioned between the jaws 14, 14 and the jaws are closed to grip the workpiece by turning the key member 28 in the proper direction using a suitable wrench which fits in the socket 44. This closing movement of the jaws 14, 14 is effected by the scroll member 20 which is rotated by the bevel gear portion 38 of the key member 28 and which includes spiral teeth on its forward face which intermesh with corresponding teeth on the rear face of the several jaws 14, 14. This operation of the jaws 14, 14 is similar to other conventional universal chucks of the scroll type. Due to the fact that the jaws 14, 14 are moved simultaneously by the scroll member 20, and in generally equal amounts, the jaws will function to automatically bring the gripped workpiece into approximate concentric relationship with the jaw supporting member 12.

By means of the present invention the jaw supporting member 12 may then be shifted in a radial plane relative to the spindle supported member 13 to bring the approximately centered workpiece into true concentric relationship with the axis of the member 13, which latter axis is coincident with the axis of the machine tool spindle. Once the two members 12 and 13 are adjusted to center a workpiece gripped by the jaws 14, 14, no further adjustment of the two members 12 and 13 need be made for other workpieces of substantially the same size. That is, assuming the chuck is to be used in making several similar articles from workpieces of the same size, the relative eccentricity of the two members 12 and 13 need be adjusted only when the first workpiece is positioned in the jaws 14, 14. Thereafter, the jaws may be operated and repeatedly opened and closed to grip and release other workpieces and will retain the ability to accurately center each of the workpieces with respect to the spindle axis without further adjustment.

The adjustment of the chuck to bring an initially off-center workpiece into concentric relationship with the spindle axis is relatively simple and requires only one adjustment of each of the adjusting screws 82, 82. After a workpiece is positioned in the jaws 14, 14, the operator places a dial indicator on the workpiece in alignment with one of the screws 82, 82 and adjusts the indicator to a zero reading. He then rotates the chuck 180° to bring the workpiece into such a position that the dial indicator is in alignment with the opposite screw 98, and observes the reading. He then rotates the chuck back to the original position in alignment with the screw 82 and adjusts that screw to cause the dial indicator to display exactly one-half of the previously observed reading. The operator then repeats the same process in connection with the other screw 82, and after the adjustment of the latter screw the workpiece will be exactly on center with the spindle axis.

It should be noted that the retaining ring 56 keeps the head portion 50 in axially fixed position with respect to the peripheral portion 46, but that the axial clamping pressure exerted by the ring is sufficiently small so that the ring will not prevent the radial adjusting movements of the head portion 50. Also, it will be observed that the relative adjustment of the two members 12 and 13 to provide for bringing the workpiece into concentricity is accomplished without the need for loosening or tightening any bolts or other fasteners. The only elements which are operated during the adjustment process are the two adjusting screws 82, 82, and each of these are operated only once.

The invention claimed is:

1. The combination in a chuck of, a jaw supporting member, a second member adapted for concentric connection to the rotatable spindle of a machine tool, said jaw supporting member and said second member having axially overlapped portions which overlapped portions are radially spaced so as to permit said jaw supporting member to be moved radially with respect to said second member, adjustment means cooperating with said axially overlapped portions for adjustably positioning said jaw supporting member radially with respect to said second member to vary the relative eccentricity of said two members and for transmitting driving torque from said second member to said jaw supporting member, said adjustment means including two mutually perpendicular flat faces on the outer surface of the radially inner one of said axially overlapped portions, and two pressure means supported for adjustable radial movement relative to the radially outer one of said axially overlapped portions, said two pressure means being engageable respectively with said two mutually perpendicular faces for the purpose of positioning said radially inner portion relative to said radially outer portion and said two mutually perpendicular faces being disposed respectively in planes parallel to the axis of said chuck, and separate means independent of said adjustment means for restraining said jaw supporting member and said second member against relative axial movement.

2. The combination in a chuck of, a jaw supporting member, a second member adapted for connection to the spindle of a machine tool, said jaw supporting member and said second member having axially overlapped portions which overlapped portions are radially spaced so as to permit said jaw supporting member to be moved radially with respect to said second member, means restraining said jaw supporting member and said second member against relative axial movement, means providing two mutually perpendicular faces on the outer surface of the radially inner one of said axially overlapped portions, two pressure means supported for adjustable radial movement relative to the radially outer one of said axially overlapped portions and which two pressure means engage, respectively, said two mutually perpendicular faces for the purpose of positioning said radially inner portion relative to said radially outer portion, and two springs radially interposed between said axially overlapped portions and disposed respectively at locations diametrically opposite from said two mutually perpendicular faces, said springs being arranged to resiliently bias said mutually perpendicular faces into firm engagement with said two pressure means.

3. The combination as defined in claim 2 further characterized by means for adjustably preloading said two springs to vary the forces exerted thereby on the radially inner one of said two axially overlapped portions.

4. The combination in a chuck of, a jaw supporting member, a second member adapted for connection to the spindle of a machine tool, one of said members having an annular peripheral flange portion defining a recess and the other of said members having a head portion which is axially restrained within said recess but is free to move relatively thereto in a radial plane to vary the relative eccentricity of said two members, means defining two flat faces on the periphery of said head portion which faces are arranged to form a right-angled V, two pressure plates restrained against angular movement relative to said peripheral flange portion and having flat surfaces which respectively bear against said two flat faces of said head portion and defined a right-angled V-shaped notch for receiving said head portion in interfitted relationship therewith, spring means interposed between said peripheral flange portion and said head portion and operable to urge said right-angled V of said head into said V-shaped notch, said two plates and said two flat surfaces serving to transmit driving torque between said two members as a result of said interfitting relationship and said spring means having a spring force sufficient to hold said head portion in such interfitted relationship with said two plates while normal driving torque is transmitted between said head portion and said plates, and two adjusting screws carried by said peripheral portion which screws respectively bear against said plates and are independently movable radially of said peripheral portion to change the radial positions of said plates relative to said peripheral flange portion to thereby vary the eccentricity of said two members.

5. The combination as defined in claim 4 further characterized by said spring means comprising two springs disposed respectively at locations diametrically opposite from said two pressure plates.

6. The combination as defined in claim 4 further characterized by said pressure plates having radial openings therein and said adjusting screws having portions on their radially inner ends which fit within said radial openings to restrain said plates against angular movement relative to said peripheral flange portion.

7. A workpiece supporting chuck comprising, a first member having a plurality of jaws on its forward face which jaws are simultaneously radially movable relative to said first member and function when moved into gripping relationship with a cylindrical workpiece to position the latter in approximate concentric relationship with the axis of said first member, a second member having means adapting the same for connection to a machine tool spindle, said jaw supporting member and said second member having axially overlapped portions which overlapped portions are radially spaced so as to enable movement of said jaw supporting member in such a radial direction as to bring an initially off-center workpiece gripped by said jaws into concentricity with the axis of said second member, means defining two mutually perpendicular flat faces on the periphery of the radially inner one of said axially overlapped portions, two pressure members engageable respectively with said flat faces to position said radially inner portion with respect to the radially outer portion, spring means interposed between said two portions at locations diametrically opposite from said flat faces which spring means are operable to urge said flat faces into firm engagement with said pressure members, and means for independently moving said pressure members radially of said outer portion to adjust the position of said inner portion relative to said outer portion, radial movement of either one of said pressure members causing relative sliding movement between the other of said pressure members and the flat face associated therewith so that said inner portion will be moved in a straight line parallel to said latter flat face with the result that said inner portion may be given the proper resultant displacement relative to said outer portion to bring an initially off-center workpiece gripped by said jaws into concentricity with the axis of said second member by moving each of said pressure members only once.

8. A workpiece supporting chuck comprising, a first member having a plurality of jaws on its forward face which jaws are simultaneously radially movable relative to said first member and function when moved into gripping relationship with a cylindrical workpiece to position the latter in approximate concentric relationship with the axis of said first member, said first member also having a rearwardly extending annular peripheral flange portion defining an annular recess in its rear face, a second member having means adapting the same for connection to a machine tool spindle and having a head portion disposed within said recess, said head portion being of such a size and shape as to fit loosely within said recess and be radially movable with respect to said first member, means for retaining said head portion axially in place within said recess, means defining two mutually perpendicular flat faces on the periphery of said head portion, two pressure members interposed between said peripheral flange portion of said first member and said head portion of said second member, said two pressure members being disposed respectively at the locations of said two mutually perpendicular faces and having flat surfaces which slidably engage said faces, two screws threadably received in radially extending openings in said peripheral flange portion of said first member and which two screws are disposed respectively at the locations of said two flat faces and are engageable at their inner ends with said pressure members to move the same radially as said screws are threaded into or out of their respective openings, means defining two recesses on the periphery of said head portion located respectively diametrically opposite from said two mutually perpendicular faces, and two springs located respectively in said two recesses and operable between said head and peripheral flange portions to urge said flat faces of said head portion into firm engagement with said pressure members, said springs being effective to oppose radial movement of said head portion upon radial inward movement of either one of said screws and to produce a return radial movement of said head portion upon radial outward movement of either one of said screws.

9. A workpiece supporting chuck comprising, a first member having a plurality of jaws on its forward face which jaws are simultaneously radially movable relative to said first member and function when moved into gripping relationship with a cylindrical workpiece to position the latter in approximate concentric relationship with the axis of said first member, said first member also having a rearwardly extending annular peripheral flange portion defining an annular recess in its rear face, a second member having means adapting the same for connection to a machine tool spindle and also having a head portion disposed within said recess, said head portion being of such a size and shape as to fit loosely within said recess and be radially movable with respect to said first member, a retaining ring connected with the said peripheral flange portion of said first member and which retaining ring extends radially inwardly from said peripheral flange portion rearwardly of said head portion to hold said head portion axially in place within said recess, means defining two mutually perpendicular flat faces on the periphery of said head portion, two pressure members interposed between said peripheral flange portion of said first member and said head portion of said second member, said two pressure members being disposed respectively at the locations of said two mutually perpendicular faces and having flat surfaces which slidably engage said faces, two screws threadably received in radially extending openings in said peripheral flange portion of said first member and which two screws are disposed respectively at the locations of said two flat faces and are engageable at their inner ends with said pressure members to cause radial movement of the same as said screws are threaded into or out of their respective openings, means defining two recesses on the periphery of said head portion located respectively diametrically opposite from said two mutually perpendicular faces, two bow springs located respectively in said two recesses with the positively curved surfaces thereof facing radially outwardly, and two screws threadably received in radially extending openings in said peripheral flange portion of said first member and which two screws are disposed respectively at the locations of said two bow springs and are engageable at their inner ends with said bow springs so as to compress the latter when threaded into their respective openings.

10. The combination in a chuck of, a jaw supporting member, a second member adapted for concentric connection to the rotatable spindle of a machine tool, said jaw supporting member and said second member having axially overlapped portions which overlapped portions are radially spaced so as to permit said jaw supporting member to be moved radially with respect to said second member, means defining two mutually perpendicular flat faces on the outer surface of the radially inner one of said axially overlapped portions and which flat faces are disposed respectively in planes parallel to the axis of said chuck, means restraining said two members against relative axial movement and permitting the same to slide relative to each other in the radial direction, two screws threadably received in radially extending openings in the radially outer one of said axially overlapped portions and which two screws are disposed respectively at the locations of said two flat faces, two pressure plates each associated with a respective one of said screws and interposed between the associated screw and the associated flat face, said pressure plates each having a flat surface substantially larger than the transverse cross section of the associated screw which flat plate surface coengages the associated flat face on said radially inner overlapped portion, means between each of said screws and the associated pressure plate for restraining each pressure plate against movement relative to its associated screw in a direction circumferentially of said overlapped portions, and two springs radially interposed between said axially overlapped portions and disposed respectively at locations diametrically opposite from said two mutually perpendicular faces, said springs being arranged to resiliently bias said mutually perpendicular faces into firm engagement with said two pressure plates.

11. The combination defined in claim 10 further characterized by said means for restraining each pressure plate including means defining a generally cylindrical radially extending opening in said pressure plate and a flat seat adjacent the radially outer end of said opening, and means defining a cylindrical portion and an inwardly facing shoulder on the inner end of said screw, said cylindrical portion being adapted to fit within said cylindrical pressure plate opening and said shoulder to flatly engage said pressure plate seat.

12. The combination in a chuck of first and second members movable radially relative to each other and including axially overlapped portions, and means interposed between said two axially overlapped portions for adjustably positioning said two members relative to each other in various radial directions, said latter means including means defining a flat face on the outer surface of the radially inner one of said axially overlapped portions, a screw threadably received in a radially extending opening in the radially outer one of said axially overlapped portions, and a pressure plate interposed between said screw and said flat face and having a flat surface substantially larger than the transverse cross section of said screw which flat plate surface coengages said flat face on said radially inner overlapped portion.

13. The combination defined in claim 12 further characterized by said pressure plate having a generally cylindrical radially extending opening therein and a flat seat adjacent the radially outer end of said opening, and said screw including a cylindrical portion and a radial shoulder on the inner end thereof, said cylindrical screw portion being adapted to fit within said cylindrical pressure plate opening and said shoulder to flatly engage said pressure plate seat.

References Cited in the file of this patent

UNITED STATES PATENTS

| | | |
|---|---|---|
| 2,524,468 | Ouimette | Oct. 3, 1950 |
| 2,639,157 | Buck | May 19, 1953 |
| 2,822,181 | Sloan | Feb. 4, 1958 |
| 2,898,120 | Goepfrich | Aug. 4, 1959 |